(12) United States Patent
Broerman

(10) Patent No.: US 6,688,557 B1
(45) Date of Patent: Feb. 10, 2004

(54) AIRFLOW DIVERTER FOR AIRCRAFT

(76) Inventor: Richard F Broerman, 8209 Berry Dr., Evansville, IN (US) 47710

( * ) Notice: Subject to any disclaimer, the term of this patent is extended or adjusted under 35 U.S.C. 154(b) by 0 days.

(21) Appl. No.: 10/233,445

(22) Filed: Sep. 3, 2002

(51) Int. Cl.$^7$ .............................. B64C 1/38; B64C 23/00
(52) U.S. Cl. ...................................................... 244/130
(58) Field of Search .................... 244/1 A, 1 N, 244/121, 129.1, 130, 199

(56) References Cited

U.S. PATENT DOCUMENTS 3,160,005 A * 12/1964 Miller et al. .................. 73/181
3,794,274 A * 2/1974 Eknes ........................ 244/130
5,496,001 A * 3/1996 Skow ......................... 244/119
5,775,643 A * 7/1998 McMaster et al. .......... 244/130

* cited by examiner

Primary Examiner—Robert P. Swiatek
(74) Attorney, Agent, or Firm—Michael I. Kroll

(57) ABSTRACT

An air diverter fixedly positioned to the underside of the nose of an aircraft and forming an integral part therewith having a bull nose form for diverting the airflow around the nose of the aircraft thereby reducing the drag on the aircraft.

9 Claims, 6 Drawing Sheets

AIRFLOW DIVERTER FOR AIRCRAFT

BACKGROUND OF THE INVENTION

1. Field of the Invention

The present invention relates generally to reducing drag in aircraft and, more specifically, to a substantially laterally disposed bullnose-shaped airflow diverter located on the underside of the nose portion of an aircraft. The present invention is situated as such to redirect the concentrated airflow traveling along the nose away from the underside of the aircraft thereby enhancing the boundary layer control by reducing the viscous drag that would ordinarily be applied thereto and increasing the mechanical an economic integrity of the aircraft.

2. Description of the Prior Art

There are other means for reducing drag in aircraft. Typical of these is U.S. Pat. No. 2,727,706 issued to L. F. Hellig on Dec. 20, 1955. Another patent was issued to C. P. Baum on Sep. 23, 1969 as U.S. Pat. No. 3,468,501. Yet another U.S. Pat. No. 4,378,922 issued to D. Pierce on Apr. 5, 1983 and still yet another was issued on Dec. 3, 1991 to A. Wortman as U.S. Pat. No. 5,069,402.

In an airplane capable of subsonic and supersonic flight a member having a leading edge, said member having a permanent portion and a temporary portion of a predetermined variation in thickness defining a streamline contour, said portions when combined forming a relatively blunt leading edge of predetermined contour primarily suitable for subsonic flight, said permanent portion alone having a relatively sharp leading edge primarily for supersonic flight, said temporary portion being separable from said permanent portion as said airplane reaches supersonic speed.

A configuration to improve the aerodynamic and aerodynamic and structural efficiency of stores such as missiles, fuel tanks, etc., which are appended externally on high performance aircraft. By making the stores triangular in cross section, with a pointed nose and tail fins, and attaching them closely to an airframe, not only is air turbulence and drag reduced, but an added uplift is given to the aircraft by the action of the wedge shaped stores in causing an air compression area under the wing.

An aircraft has a series of strakes in the form of laterally projecting barbs (low aspect ratio semi-delta type aerofoils) extending longitudinally rearwards from and on each side of the nose, each barb lying substantially parallel to the longitudinal axis.

An aircraft having an upswept tail section fuselage includes a single pair of large vortex generators mounted in the vicinity of the break in the fuselage ahead of or at the beginning of the tail upsweep, each vortex generator being mounted on a side of and adjacent the bottom of the fuselage. The vortex generators, which may be plates or fins, develop strong transverse outflow from the vertical plane of symmetry that relieves or delays the tendency to flow separation by acting on the external flow field while at the same time energizing the boundary layer to increase its resistance to separation. The vortex generator may be thin or slightly thickened, flat or airfoil shaped, and may have triangular, straight, tapered, or reverse tapered platforms and may be rigid or flexible. Either one or both edges may be blunted, although sharp edges are preferred.

While these aircraft drag reduction means may be suitable for the purposes for which they were designed, they would not be as suitable for the purposes of the present invention, as hereinafter described.

SUMMARY OF THE PRESENT INVENTION

A primary object of the present invention is to provide an airflow diverter for aircraft to redirect the flowfield away from the underside of the fuselage as it travels downward from the nose portion thereof thereby reducing the viscous drag applied to said underside.

Another object of the present invention is to provide an airflow diverter for aircraft to improve the stability thereof by redirecting the flowfield equilaterally downward and to the sides of the fuselage.

Yet another object of the present invention is to provide an airflow diverter for aircraft that will increase the fuel economy thereof by reducing the drag applied thereto.

Still another object of the present invention is to provide an airflow diverter for aircraft that will provide improved resistance to sudden turbulence that may be encountered through wind shear and other such factors.

Yet another object of the present invention is to provide an airflow diverter for aircraft that is inexpensive to manufacture and operate.

One more object of the present invention is to provide an airflow diverter for aircraft that is simple and easy to use.

Additional objects of the present invention will appear as the description proceeds.

The present invention overcomes the shortcomings of the prior art by providing an airflow diverter for aircraft that will redirect the concentrated air flow initiated by the nose and redirect it to the sides and downward rather than allowing the concentrated air flow from traveling along the underside of the aircraft while also providing increased lift and stability when turbulence is encountered.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

LIST OF REFERENCE NUMERALS UTILIZED IN THE DRAWINGS

10 air diverter
12 aircraft
14 fuselage
16 aircraft nose
18 airflow field
20 boundary layer
22 air diverter housing
24 air diverted leading edge
26 air diverter top surface
28 air diverter bottom surface
30 air diverter first side
32 air diverter second side

BRIEF DESCRIPTION OF THE DRAWING FIGURES

In order that the invention may be more fully understood, it will now be described, by way of example, with reference to the accompanying drawing in which.

DETAILED DESCRIPTION OF THE PREFERRED EMBODIMENTS

The following discussion describes in detail one embodiment of the invention and several variations of that embodiment. This discussion should not be construed, however, as limiting the invention to those particular embodiments. Practitioners skilled in the art will recognize numerous other embodiments as well. For a definition of the complete scope of the invention, the reader is directed to the appended claims.

Figure 1:
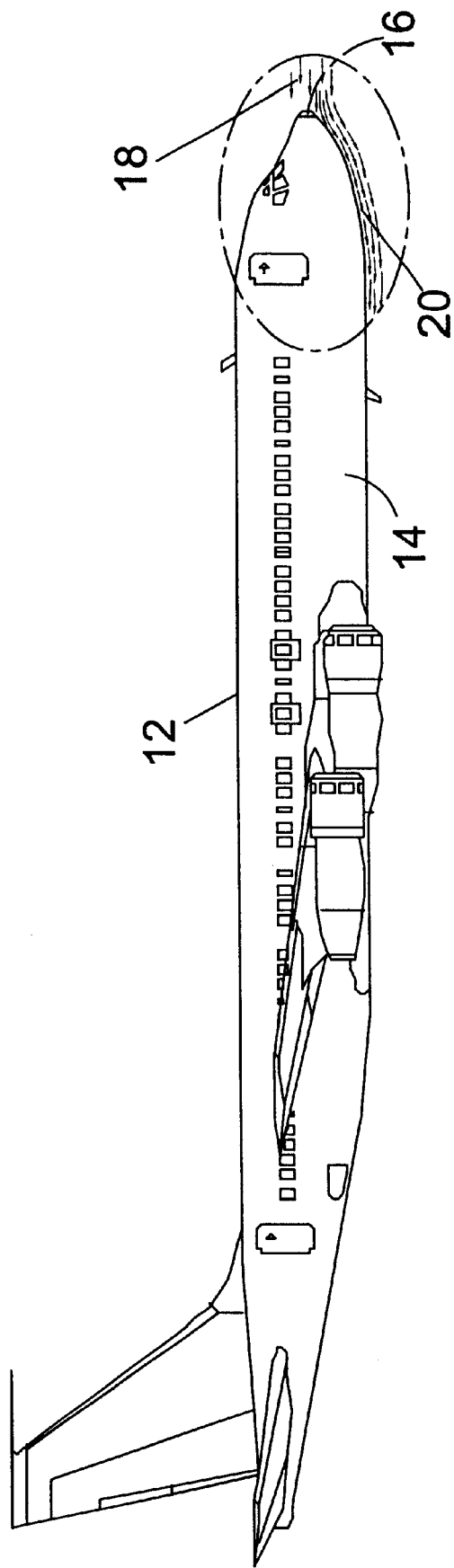
FIG. 1 is a side view of the prior art.

FIG. 1 is a side view of an aircraft 12 of the prior art. Shown is a conventional airliner 12 with an exaggerated sectional depiction of the air movement 18 in the boundary layer 20 of the flowfield 18 as the air strikes the nose 16 of the fuselage 14 and is directed to flow along the underside thereof. The flowfield 18 is concentrated by the accumulation along the surface of the nose 16 and results in an increase of skin friction drag or viscous drag as the boundary layer 20 of the flowfield travels along the surface of the fuselage 14.

Addressing drag reduction is critical to the aerospace industry since the typical energy loss due to viscous losses in a large transport aircraft such as the one illustrated could be as much as 40 per cent thereby penalizing the performance and the economics of the aircraft.

Figure 2:
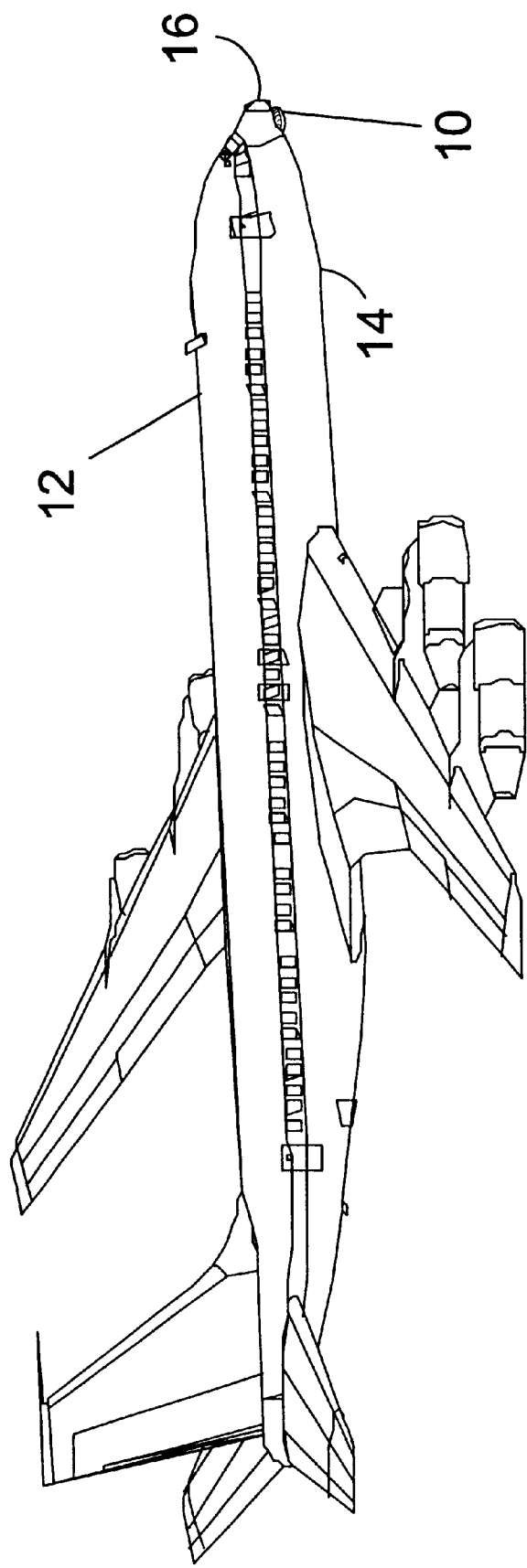
FIG. 2 is an illustrative view of the present invention installed on an aircraft.

FIG. 2 is an illustrated view of the air diverter 10. The present invention is designed for installation on aircraft 12 for the purpose of diverting initial nose 16 drag and reducing the ensuing viscous drag on the underside of the fuselage 14 as air flows therealong. Furthermore, the bullnose structure of the present invention 10 serves to act as a stabilizer fin so as to restrict the response of the nose 16 portion of the aircraft 12 when subjected to sudden turbulent conditions such as wind shear.

Figure 3:
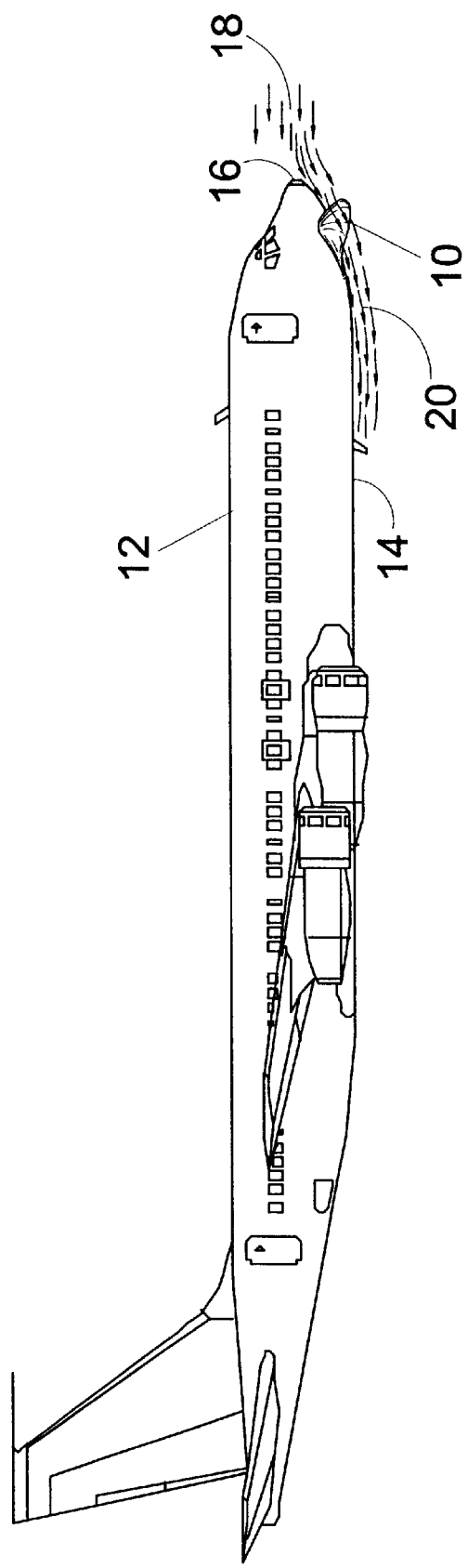
FIG. 3 is a side view of the present invention installed diverting the airflow.

FIG. 3 is a side view of the air diverter 10 installed on an aircraft 12. Shown is a conventional airliner 12 with an exaggerated sectional depiction of the air movement 18 in the boundary layer 20 of the flowfield as the air strikes the nose 16 of the fuselage 14 and is directed to flow along the underside thereof. The flowfield 18 is concentrated by the nose surface 16 and results in an increase of skin 14 friction drag or viscous drag as the boundary layer 20 of the flowfield travels along the surface of the fuselage 14.

Figure 4:
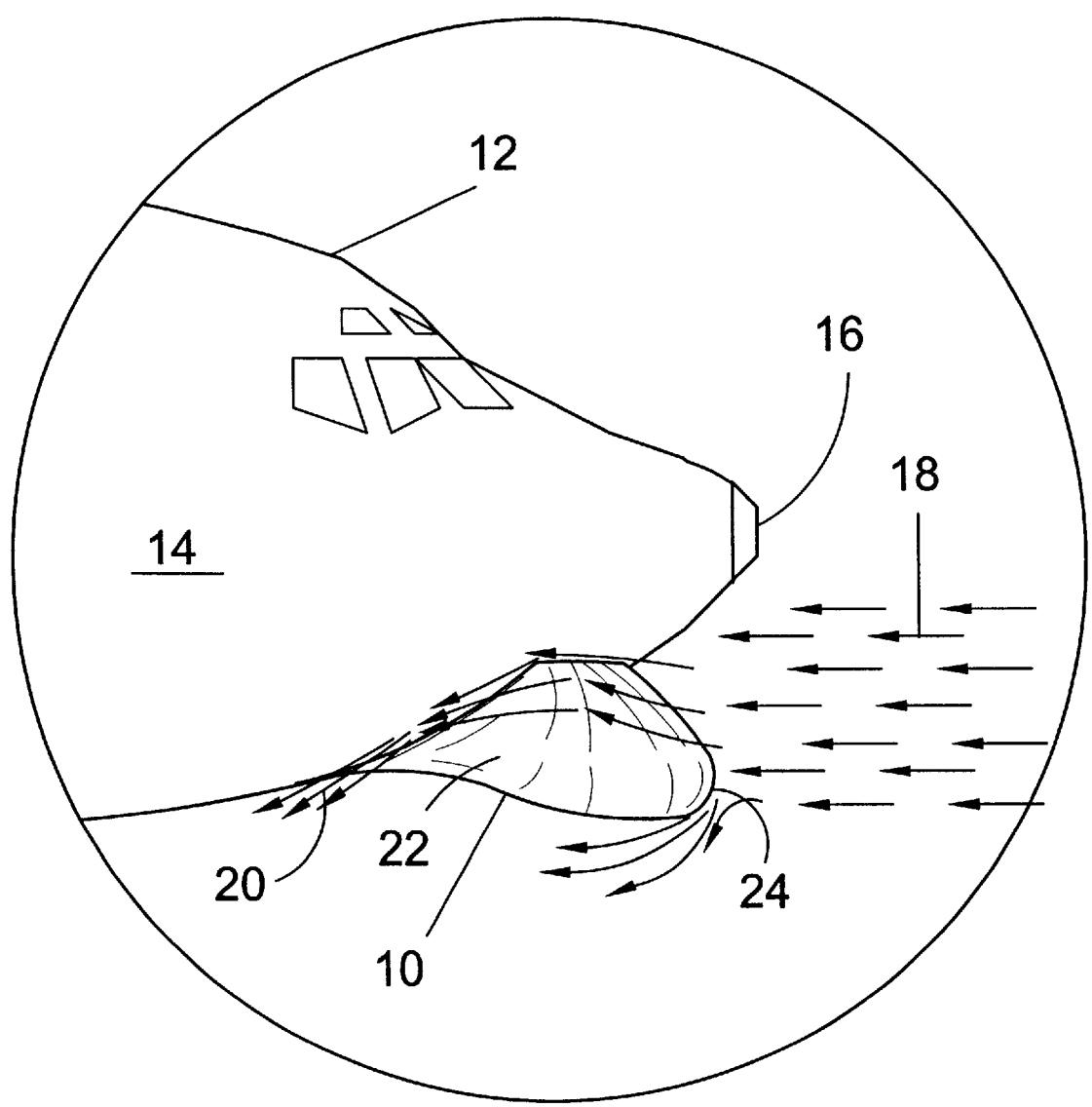
FIG. 4 is an enlarged view of the air diverter.

FIG. 4 is an enlarged view of the present invention 10 installed on an aircraft 12 where the air diverter leading edge 24 diverts the air 18 across the air diverter housing 22. The bullnose configuration of the air diverter 10 provides aerofoil properties as the airflow 18 is directed sideways and downward by the air diverter housing 22 to help stabilize the nose portion 16 of the aircraft 12.

Figure 5:
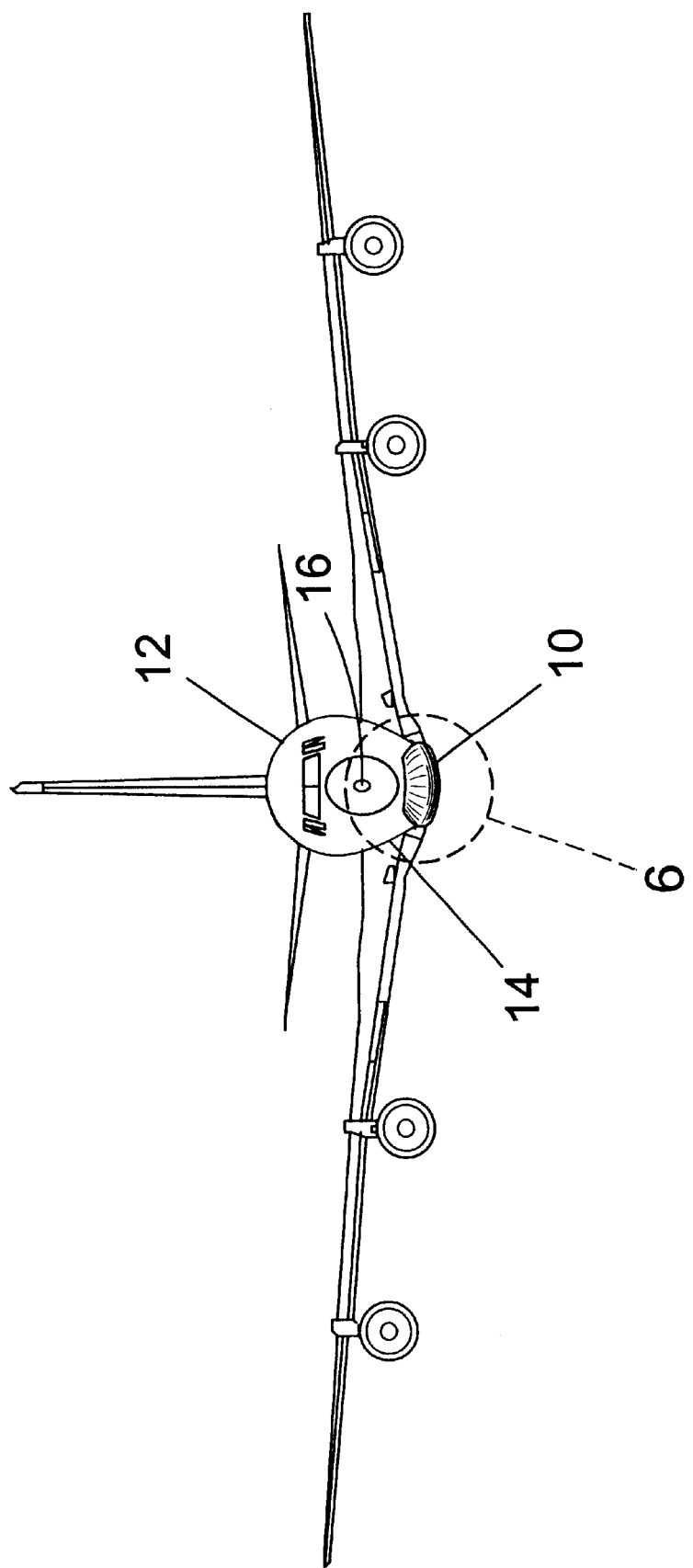
FIG. 5 is a front view of an aircraft having an air diverter.

FIG. 5 is a front view of the present invention 10 installed on an aircraft 12. The present invention is a bullnose air flow diverter 10 for reducing viscous drag on the underside of the fuselage 14 of an aircraft 12 and stabilizing the nose 16 of the aircraft 12 when encountering sudden turbulent conditions.

Figure 6:
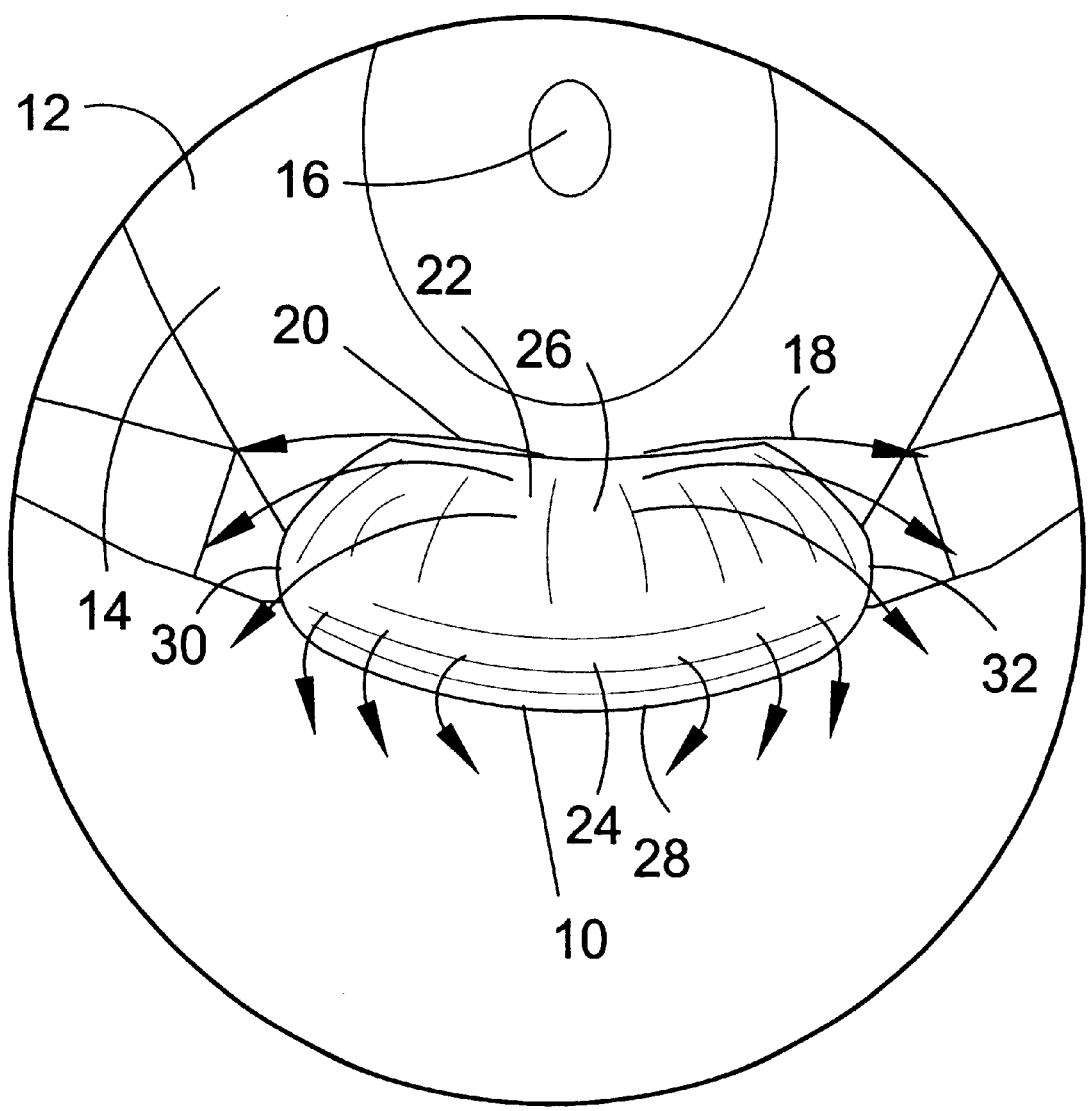
FIG. 6 is an enlarged front view of the installed air diverter.

FIG. 6 is a detailed front view of the present invention 10 installed on an aircraft 12. Air flow 18 is diverted by the leading edge 24 of the air diverter 10 laterally and downward along air diverter housing 22 top surface 26, bottom surface 28, first side 30, and second side 32 away from the boundary layer 20 of the flow field 18 on the underside 14 of the present invention 10. The airflow diverter 10 also stabilizes the nose 16 of the aircraft 12 making it less responsive to shear conditions.

What is claimed is new and desired to be protected by Letters Patent is set forth in the appended claims:

1. A structure positioned under the nose of an aircraft and forming a part therewith having a curvilinear convex surface extending forwardly from the fuselage of an aircraft for reducing drag, said device forming an enclosed housing having a base fixedly attached to the fuselage of the aircraft said device residing under the nose of the aircraft and being cantilevered to the fuselage of the aircraft, and the upper surface of the device forms a substantially U-Shape with the nose of the aircraft.

2. The device as recited in claim 1, wherein the upper surface is bonded at one distal end to the fuselage of the aircraft and the other distal end travels curvilinear forming the top leading edge of the device.

3. The device as recited in claim 2, wherein the leading edge of the device has a convex shape.

4. The device as recited in claim 3, wherein the lower surface of the device is bonded at one distal end to the fuselage of the aircraft and the other distal end travels curvilinear forming the bottom leading edge of the device.

5. The device as recited in claim 4, wherein the device has spaced apart curved left and right sides connected to the fuselage and forming a closed surface with the leading edge of the device.

6. The device as recited in claim 5, wherein a mid-transversal cross section has an elliptical shape.

7. The device as recited in claim 6, wherein the device diverts the airflow along the undercarriage of the aircraft.

8. The device as recited in claim 7, wherein the device impedes the laminar flow of the air along the fuselage of the aircraft.

9. The device has recited in claim 8, wherein the device effecting the air pressure gradient along the aircraft reduces surface friction drag.

* * * * *